United States Patent [19]

Capra

[11] Patent Number: 4,796,902

[45] Date of Patent: Jan. 10, 1989

[54] STEERABLE SLED EQUIPPED WITH RUNNER MEANS

[75] Inventor: Silvano Capra, Carzano, Italy

[73] Assignee: Manghen S.r.l., Parma, Italy

[21] Appl. No.: 61,286

[22] Filed: Jun. 12, 1987

[30] Foreign Application Priority Data

Jun. 19, 1986 [IT] Italy ............................. 59013/86[U]
Mar. 6, 1987 [IT] Italy ............................. 21050/87[U]

[51] Int. Cl.⁴ ............................................ B62B 13/08
[52] U.S. Cl. ................................... 280/16; 280/21 A
[58] Field of Search ................. 280/16, 21 R, 21 A, 280/112 A, 15, 17

[56] References Cited

U.S. PATENT DOCUMENTS

| | | | |
|---|---|---|---|
| 3,140,099 | 7/1964 | Feu | 280/21 A |
| 3,361,436 | 1/1968 | Williams | 280/21 A |
| 3,760,895 | 9/1973 | Martinmaas | 280/21 A X |
| 3,827,516 | 8/1974 | Lucia | 280/21 A X |
| 4,036,506 | 7/1977 | Scheib | 280/21 A |
| 4,279,427 | 7/1981 | Kawazoe | 280/16 |
| 4,405,140 | 9/1983 | Stevens | 280/16 |

Primary Examiner—David M. Mitchell
Assistant Examiner—Michael Mar
Attorney, Agent, or Firm—Robbins & Laramie

[57] ABSTRACT

A steerable sled equipped with runner members such as one or more pairs of skis for sliding on snow or the like comprising a chassis associated with the runner members, characterized in that the sled comprises a suspension system interposed between the chassis and the runner members, a direction-control apparatus having a steering wheel mounted to a steering column, and at least a pair of triple-hinge members, each defining three mutually perpendicular rotational axes, with one of the rotational axes being perpendicular to the support plane of the runner members, at least one pair of hinge members being interposed between the chassis and at least one of the pair of runner members, and being associated with apparatus for the remote-control, through the steering column, of the rotation of the runner members.

18 Claims, 5 Drawing Sheets

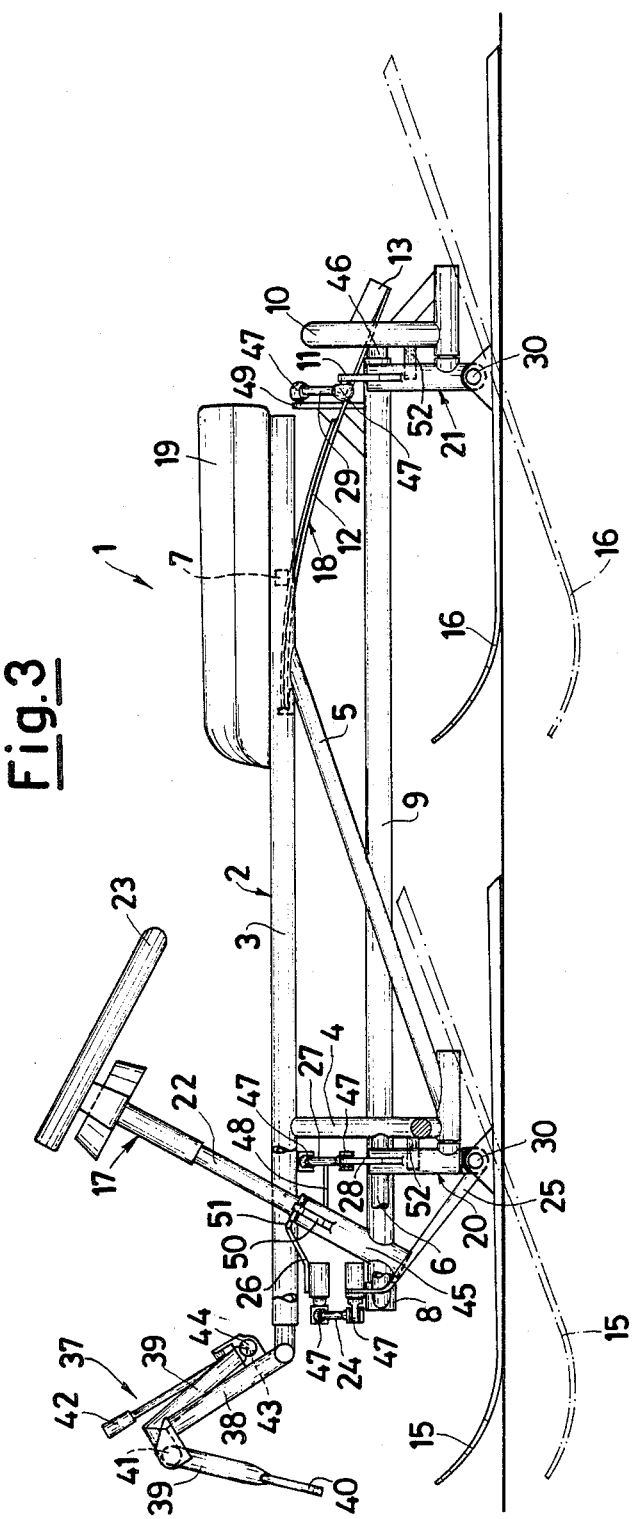

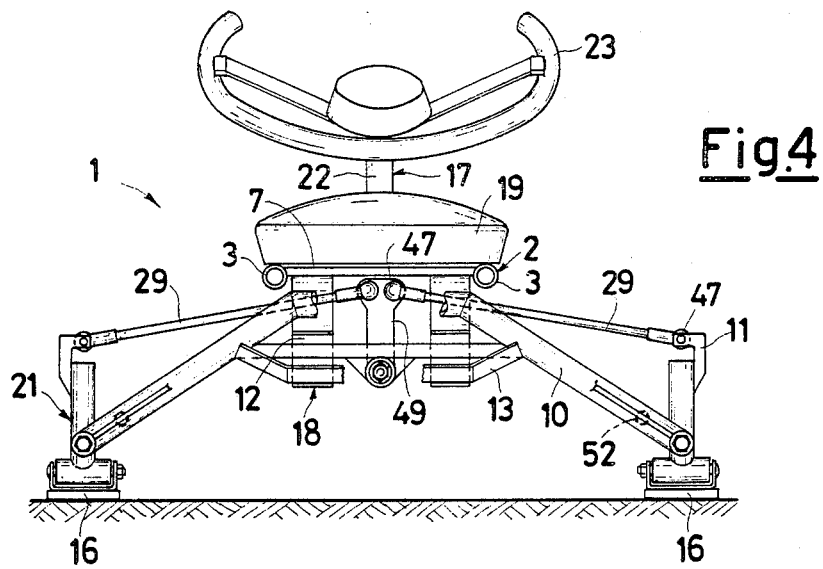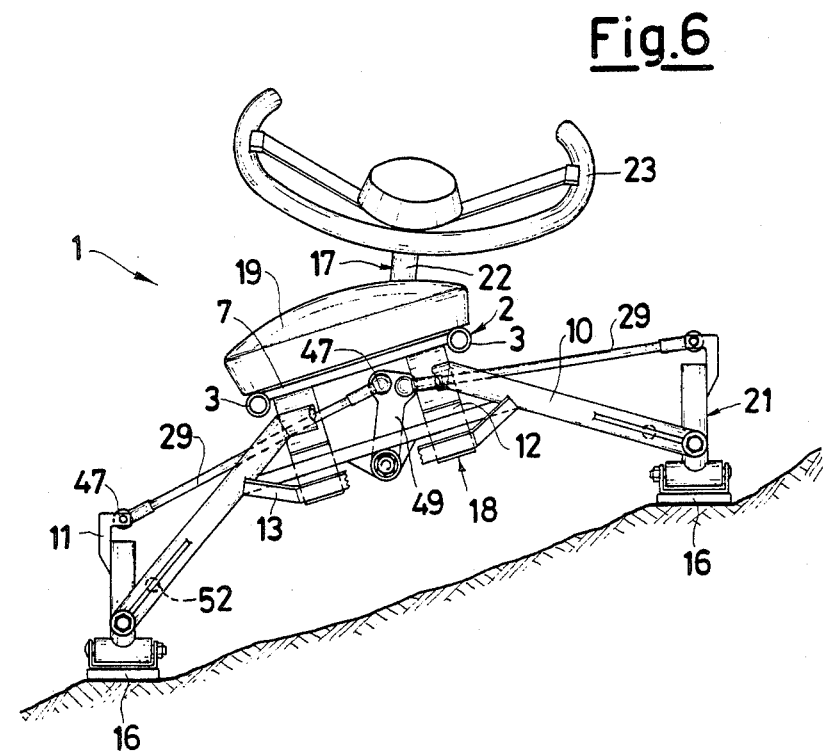

STEERABLE SLED EQUIPPED WITH RUNNER MEANS

BACKGROUND OF THE INVENTION

The present invention relates to a steerable sled equipped with runner means such as one or more pair of skis.

The presently marketed sleds are equipped with a pair of monobloc, essentially stiff (fixed position) runners, which do not allow the direction of the sled to be easily controlled when travelling downhill along snow-covered slopes, above all when the need arises for changing the direction of sled travel and sled angular orientation with respect to the ground. The above mentioned sleds are also very stiff, and generally do not display any compensation for the unevennesses of the ground, thus increasing the difficulty in controlling the sled.

Motor-driven sleds are known however, which are provided with a pair of front steering runners, thus enabling the driver to change the direction of sled travel. During this operation, or when travelling downhill along particularly steep slopes, the roadholding of this sled is accomplished both by the rear traction crawlers, as well as by particular profiles provided on the lower surface of the runners. which profiles penetrate the mantle of snow in an edge-like fashion, so to increase the road-holding capabilities of the sled.

Anyone can easily realize how the steerability of such sleds may become difficult, above all when the motor drive is not present, and when particularly steep or uneven paths must be run along.

Accordingly, it is a purpose of the invention to provide a sled capable of overcoming the above mentioned drawbacks, which also allows a high level of maneuverability level and control, even on considerably steep slopes, independently on the type of path, and of the angular orientation of the sled and its direction of travel, and on the unevennesses of the ground.

This, and still other objects and advantages according to the present invention are achieved by providing a steerable sled equipped with runner means such as one or more pair of skis for sliding on snow or the like comprising a chassis associated with said runner means, characterized in that the sled comprises a direction-control apparatus having a steering wheel mounted to a steering column, a suspension system interposed between said chassis and said runner means, said direction-control apparatus comprising furthermore at least a pair of triple-hinge members, each defining three mutually perpendicular rotational axes, with one of said rotational axes being perpendicular to the support plane of said runner means, at least one pair of hinge members being interposed between said chassis and at least one of the pair of said runner means, and being associated with means for the remote-control, through said steering column, of the rotation of said runner means.

BRIEF DESCRIPTION OF THE DRAWINGS

A sled according to the invention is illustrated for purely exemplifying, and non-limitative, purposes, in the hereto attached drawing tables, wherein:

FIG. 3 shows a side view of the sled depicted in FIG. 1;

FIG. 4 shows a rear view of the sled depicted in FIG. 1.

FIG. 6 shows a schematic view of the rear portion of the sled, with the runners being in edge-engagement position along the side of a hill.

DETAILED DESCRIPTION OF THE PREFERRED EMBODIMENT

Figure 1:
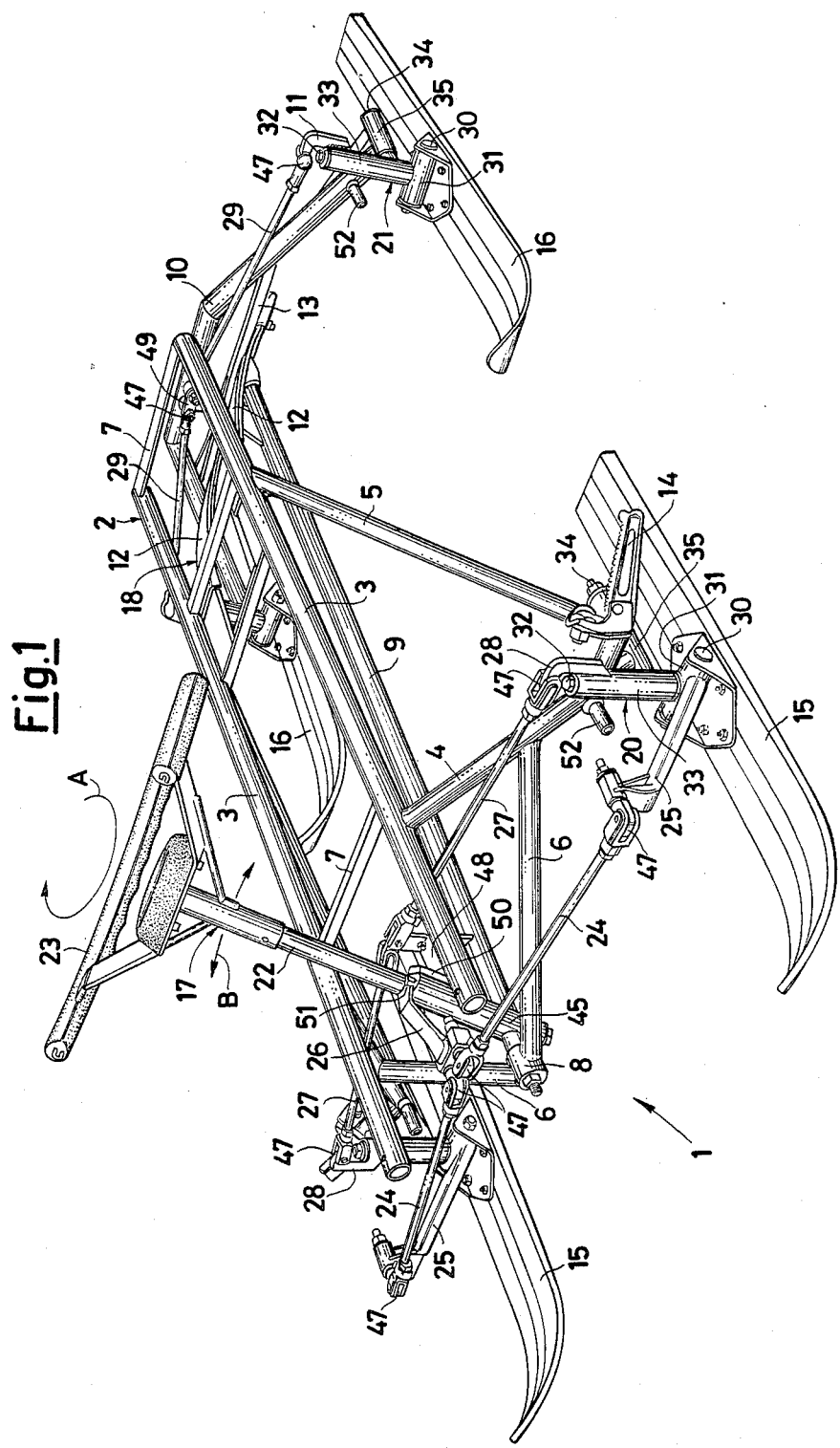
FIG. 1 shows a perspective view of the sled of the invention, wherein the saddle is not shown, for the purpose of facilitating the viewing of some members.

Referring to the above cited figures, the sled of the present invention, generally indicated at 1, comprises a bearing chassis, or monocoque body, 2, which is connected to runner means, such as a pair of front skis 15 and a pair of rear skis 16, with the interposition of a direction-control system 17 and of a suspension system 18.

The chassis 2 is constituted by a set of welded tubes, 3, 4, 5, 6 and 7, fastened to each other so as to form, in their whole, a stiff and strong cross-link structure supporting a saddle 19.

A pair of tubes 3 are so positioned that the tubes are parallel to each other and joined to each other by cross-member elements 7, so as to provide an upper plane for saddle 19 support. Further, front tubes 4 and rear tubes 5 extend from said pair of tubes 3 downwards and laterally outwardly, for supporting a direction-control system 17 in cooperation with a pair of tubes 6 extending from said front tubes 4 and converging towards the front portion of the sled 1 to support an essentially horizontal sleeve 8.

The direction-control system, which is generally indicated at 17, is constituted by corresponding pairs of multiple-hinge means, respectively front, triple-hinge means 20, and rear, double-hinge means 21, associated with and actuated by remote-control means, as is described in greater detail below.

The means for effecting the remote control of the rotations of the hinge means 20 and 21 comprise a first jointed-lever unit, and a second jointed-lever unit, composed by selectively and alternatively acting tie-rods and/or struts with the interposition of a set of articulated joints, to be actuated by means of a steering column 22 and a steering wheel 23.

More precisely, rotatably inserted inside said sleeve 8, an end is positioned of a further tubular element 9, integral with which an inclined and upwards-directed guide sleeve 45 is provided, which sleeve 45 performs the task of allowing said steering column 22 to rotate.

At its other end, the further tubular element 9 receives in its interior a length of smaller-diameter tube 46, in a plunger-like fashion, with a return pull being applied to it by an inner elastic element (now shown), said length of smaller-diameter tube 46 having its outer end constrained to a cross-member 10, which too is made from welded tubes, and supports the rear multiple-hinge means 21.

In front of said guide sleeve 45 and above it, a bracket 26 is constrained to the steering column 22 and supports articulated joints 47 of connection to first transversal rods 24, which are connected, in their turn, to second rods 25 of constraint relatively to said hinge means 20 through further articulated joints 47 which constitute, in their whole, said first jointed-lever unit.

Figure 5:
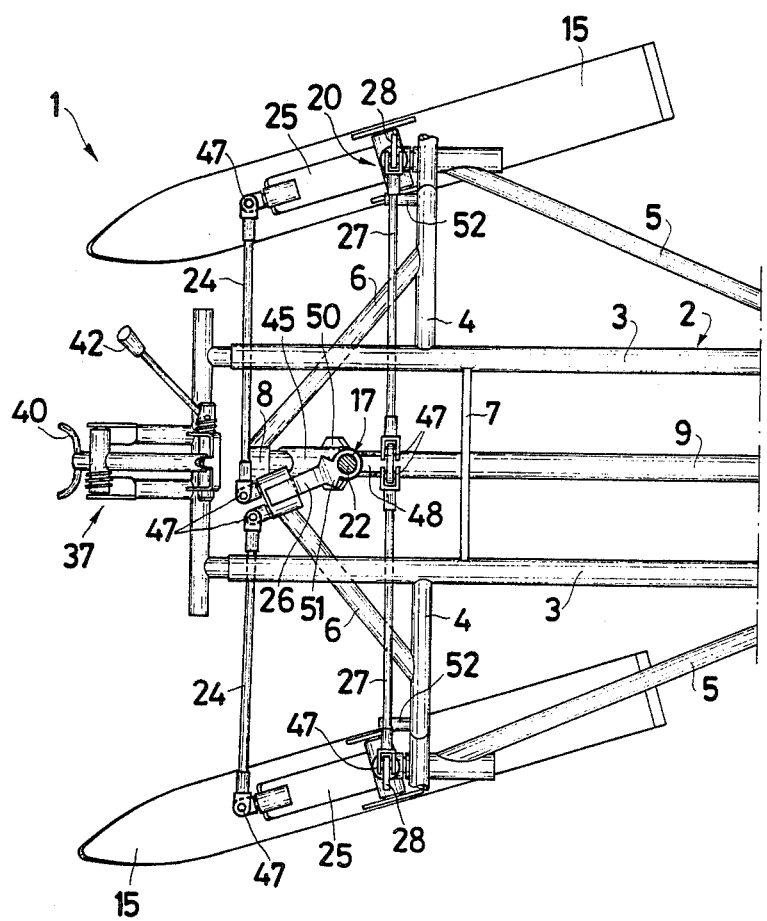
FIG. 5 shows a top plan schematic view of the front portion of the sled, with the front runners in a turned position.

Rearwards to said guide sleeve 45, a composite or T-shaped bracket 48 (FIGS. 1, 3 and 5) is constrained, which is also integral with the tubular element 9, and is provided with articulated joints 47 of connection with third transversal front rods 27, which are, in their turn, connected with fourth rods 28 of constraint relatively to the hinge means 20 by means of further articulated joints 47. Integral with said tubular element 9, adjacent the end thereof which is close to the cross-member 10, on a further vertical bracket 49 supported are further articulated joints 47 of connection with further third rear rods 29 which are, in their turn, connected with fourth rear rods 11 of constraint relatively to hinge means 21 by means of further articulated joints 47. Third and fourth front rods 27, 28, together with bracket 48 and articulated joints 47, along with vertical bracket 49, articulated joints 47 and third and fourth rear rods 29, 11, collectively comprise the second lever unit actuable through interconnecting tubular element 9 and respective hinge means 20 and 21.

The means for the remote control of the rotations comprising the first jointed-lever unit, and the second jointed-lever unit actuatable by means of the steering column 22 and the steering wheel 23 are equipped with means for limiting their stroke. In fact, on the guide sleeve 45, laterally and on opposite sides, stop tabs 50 are provided, which engage shaped portions 51 of the bracket 26, such to limit the rotation of the steering column 22. Furthermore, on the front tubes 4 and on the rear shaped cross-member 10, studs 52 are provided, which protrude in a longitudinal direction, such to limit the swinging motion of the second jointed-lever unit given by the steering column 22.

The rear cross-member 10 has a trapezoidal shape, has its ends linked to hinges 21, and is reinforced by a further cross-member element 13.

The rear cross-member element 13 is linked, in its turn, to a first end of a pair of leaf springs 12, the second end of which is integral with a cross-member element 7 of the chassis 2. Thus, a further constraint is accomplished between the shaped cross-member 10 supporting the rear hinge means 21 and the chassis 2.

The pair of leaf springs 12 and the tube length 46 acting as a shock absorber inside the tubular element 9 constitute, in their whole, the said suspension system 18.

The front multiple-hinge means are constituted by a first pin 30 integral with the front runner means 15 and rotating about a transverse axis inside a first sleeve 31, with which a second pin 32 is centrally and perpendicularly integral. The second pin 32 rotates about a vertical axis inside a second sleeve 33, which is perpendicularly integral with a third pin 34 rotating about a horizontal axis inside a third sleeve 35 constrained to the convergence of the front tubes 4 and of the rear tubes 5 of the chassis 2, together with tilting foot-board elements 14 for supporting the sled user's feet.

In the rear multiple-hinge means 21, as opposed to the front multiple-hinge means 20, no possibility exists of a relative motion between the second pin 32 and the second sleeve 33, i.e., the rear multiple-hinge means 20 does not provide for rotation about its vertical axis.

Advantageously, in the front portion of the chassis 2, a hooking device 37 is provided for the purpose of allowing the sled to be towed by a conventional lift facility such as a ski lift or ski tow.

Figure 2:
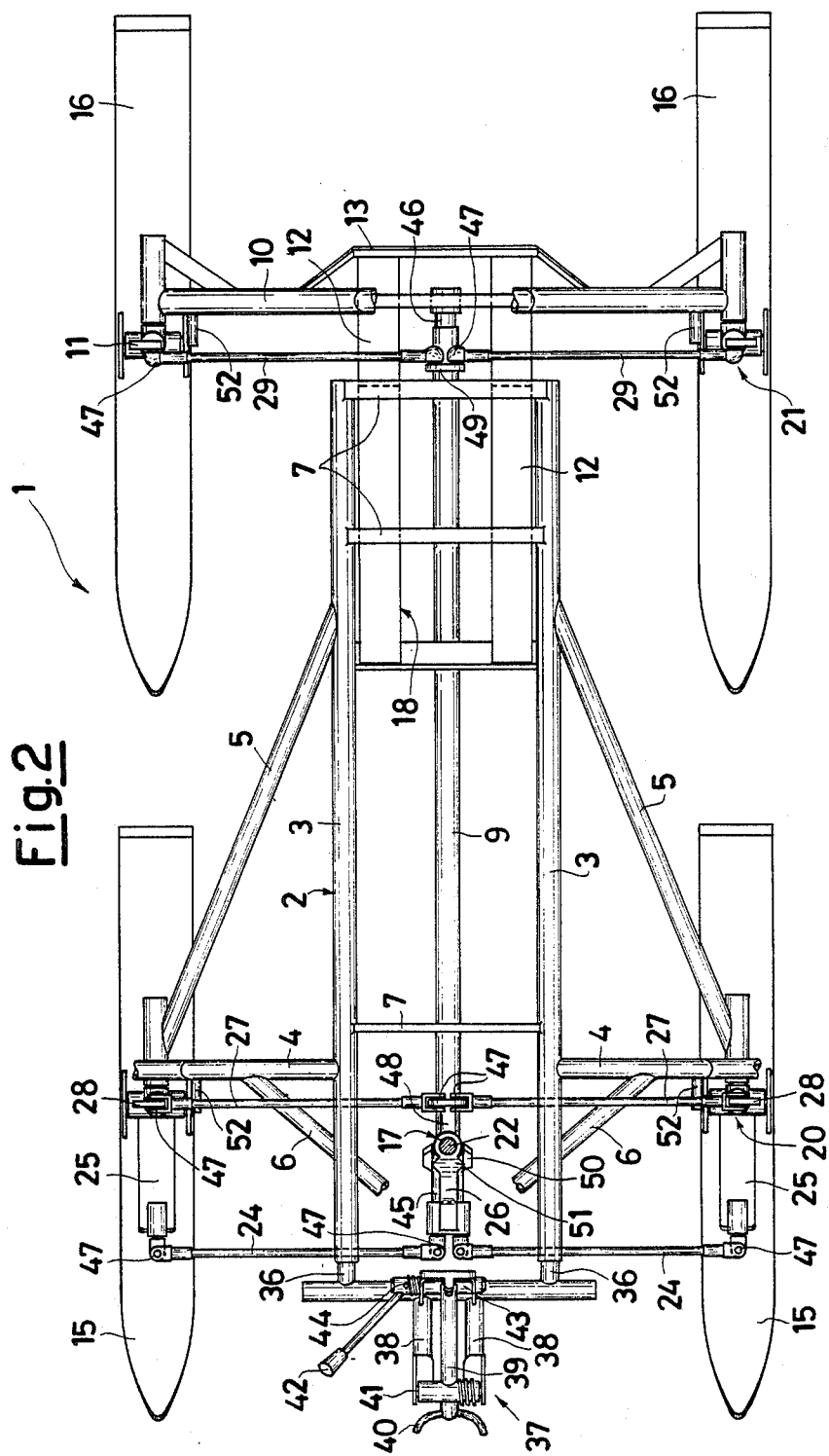
FIG. 2 shows a top plan view of the sled of FIG. 1, wherein the saddle and the steering column are not shown.

Said hooking device 37 (FIGS. 2 and 3) is provided with a tubular structure 36 connectable to the chassis 2 by means of two tubular elements thereof suitable to be slipped inside the pair of tubes 3. On a pair of uprights 38, which extend from said structure 36, a metal element 39 is supported, which is hinged in 41, and is provided, at a first end thereof, with a fork 40. The second end of said element 39 is engaged by lock means 43 supported on a shaft 44 controlled to rotate by a lever 42.

The functioning of a steerable sled according to the invention is briefly illustrated.

During the travelling of the sled, by rotating counter-clockwise, and around its axis, the steering column 22 inside the guide sleeve 45 according to arrow A (FIG. 1), the corresponding rotation is obtained of the only front runner means 15 (FIG. 5), due to the actuation of the bracket 26 and of the levers 24 and 25, and to the consequent relative rotation between the second pin 32 and the second sleeve 33 of the front multiple-hinge means 20 about the vertical axis. In an analogous way, also the rear runner means 16 can be controlled by the steering means. By tilting the steering column 22 to the right, or to the left, according to arrow B, the runner means 15 and 16 are consequently tilted about the horizontal axis by means of the action of the levers 27, 28, 29 and 11, and of the tubular element 9, which jointly caused the relative rotation of the third pin 34 and of the third sleeve 35 of the front multiple-hinge means 20 and rear multiple-hinge means 21.

The tilting and the rotation of the runner means 15 and 16 determine a position of edge-engagement for the runner means, which allows both the travelling direction to be accurately changed, and the sled speed to be controlled, as well as said sled to be stopped. Control of runner means 15 and 16 in the above-described manner allows also the sled to slip downhill during the passage along the side of slopes covered with snow. In this latter case, the steering column 22 is tilted towards the slope, as shown in FIG. 6. Furthermore, to facilitate a better fitting of the sled to the snow, the four runner means are hinged at 30, so as to provide the possibility of tilting upwards or downwards about a transverse axis, as shown by the chain lines in FIG. 3.

The forces and the stresses generated by the unevennesses of the ground, and transmitted to the chassis, are absorbed by the suspension system 18, which allows the rear runner means 16 and the rear multiple-hinge means 21 associated to the cross-member 10 and to the cross-member element 13 to elastically shift relatively to the front portion of the chassis 2, due to the elastic deformation of the leaf springs 12 and to the absorption of the inner elastic element (not shown) integral with the tube length 46. Thus, a mutual twisting is allowed between the front runner means and the rear runner means, so as to allow a better contact with the snow surface.

The sled 1 can be easily towed by means of the hooking device 37 by a common lift facility such as a "ski-lift" or ski tow. A plate installed on the end of the pulling rope of the ski-lift is retained by the fork 40 of the element 39, which is prevented from rotating around the pin 41 by the lock means 43 provided on a spindle 44 and actuated by manually pulling the lever 42.

The release of the lever 42 causes the element 39 to automatically rotate around the pin 41, with the consequent rotation upwards of the fork 40, and disengagement of the plate. Of course, if the hooking device 37 is not necessarily, it can be easily removed from the sled by simply slipping the tubular structure 36 out from the chassis 2, after the preliminary removal of mutual constraint means (not shown).

I claim:

1. A steerable sled, comprising: a front chassis connected to a rear chassis through a suspension system and a directional control system, and a pair of sled runner members connected to at least one of the chassis through said directional control system, the directional control system comprising a steering wheel coupled to a rotable and laterally displaceable steering column, a pair of hinge linkages, each hinge linkage being connected to a corresponding one of the sled runner members and defining at least two mutually perpendicular rotational axes, one of which axes is a horizontal rotational axis, and sled runner actuation means including a sled runner actuation rod extending generally parallel to the longitudinal axis and interconnecting the front chassis, steering column and rear chassis for transmitting directional input from the steering column to the sled runnner members about the horizontal rotational axis through the hinge linkages, said sled runner actuation rod being coupled to said rear chassis by means for effecting axial and rotational displacement of said rear chassis relative to said front chassis.

2. A steerable sled according to claim 1, further comprising a second pair of sled runner members, wherein the first pair of sled runner members is coupled to the front chassis through the hinge linkages and the second pair of sled runner members is coupled to the rear chassis.

3. A steerable sled according to claim 2, wherein each of the second pair of sled runner members is coupled to the rear chassis through a corresponding one of a second pair of hinge linkages, the second pair of hinge linkages defining at least two mutually perpendicular rotational axes about which the second pair of sled runner members is rotatable, the sled runner actuation means extending between the steering column and the first and second pair of hinge linkages.

4. A steerable sled according to claim 3, wherein directional control can be imparted from the steering column to the first and second pair of sled runner members simultaneously along a single rotational axis.

5. A steerable sled according to claim 4, wherein directional control can be imparted to the first and second pair of sled runner members along a horizontal rotational axis to provide for side-to-side tilting of the runner members.

6. A steerable sled according to claim 5, wherein directional control can be imparted to the first pair of sled runner members along a vertical rotational axis independently of rotation along the horizontal rotational axis.

7. A steerable sled according to claim 3, wherein the sled runner actuation rod includes lever means mounted thereon for direction rotation of the first and second pair of sled runner members about the horizontal axis.

8. A steerable sled according to claim 7, wherein the sled runner actuation means further comprises lever means coupling the steering column to the first pair of hinge linkages for imparting rotational control of the first pair of sled runner members about a vertical rotational axis independently of rotational input imparted to the first and second pairs of sled runner members about the horizontal rotational axis.

9. A steerable sled according to claim 7, wherein each of the first pair of hinge linkages defines mutually perpendicular vertical, horizontal and transverse rotational axes and each of the second pair of hinge linkages defines mutually perpendicular horizontal and transverse rotational axes, the first lever unit direction rotation of the first pair of sled runners about the vertical rotational axis and the second lever unit directing rotation of the first and second pair of sled runners about the horizontal rotational axis.

10. A steerable sled according to claim 1 further comprising means for detachably coupling the sled to a conventional ski lift facility.

11. A steerable sled according to claim 10, wherein each hinge linkage comprises a first pin rotatably received within a first sleeve, a second sleeve perpendicularly and integrally formed with respect to said first sleeve for rotatably receiving a second pin, and a third sleeve perpendicularly and integrally formed with respect to said second sleeve for rotatably receiving a third pin, directional control being selectively and independently impartable to said first and second sleeves.

12. A steerable sled according to claim 10, wherein the first sleeve provides for rotational movement of the sled runner member along a transverse axis, the second sleeve provides for rotational movement of the sled runner members along a vertical axis, and the third sleeve provides for rotational movement of the sled runner members along a longitudinal axis, directional control of the runner members being independently transmittable from the steering column to the hinge linkages for rotating the sled runner members along the longitudinal and vertical axes only.

13. A steerable sled according to claim 1, wherein the suspension system comprises at least one leaf spring connected at one end to the front chassis and at another end to the rear chassis.

14. A steerable sled according to claim 1, further comprising a seat mounted to one of the chassis.

15. A steerable sled according to claim 1, wherein each hinge linkage defines three mutually perpendicular and independently operable rotational axes about which the sled runner members are rotatable, directional control being selectively and independently impartable to the sled runner members through the hinge linkages in two of said rotational axes.

16. A steerable sled according to claim 1, wherein said means for effecting axial and rotational displacement of said rear chassis relative to said front chassis comprises a tubular member telescopically received by said actuation rod.

17. A steerable sled according to claim 1, wherein said front chassis comprises a pair of parallel frame members which extend generally parallel to a longitudinal axis of the sled.

18. A steerable sled according to claim 17, further comprising means carried by said front chassis for rotatably receiving a front end of said sled runner actuation rod.

* * * * *